United States Patent
Bao et al.

(10) Patent No.: US 11,240,346 B2
(45) Date of Patent: *Feb. 1, 2022

(54) METHOD, DEVICE, AND SYSTEM FOR COMMUNICATING A CHANGEABILITY ATTRIBUTE

(71) Applicant: Unify GmbH & Co. KG, Munich (DE)

(72) Inventors: Yu Bao, Boca Raton, FL (US); James Smith, Nottingham (GB)

(73) Assignee: Unify GmbH & Co. KG, Munich (DE)

( * ) Notice: Subject to any disclaimer, the term of this patent is extended or adjusted under 35 U.S.C. 154(b) by 262 days.

This patent is subject to a terminal disclaimer.

(21) Appl. No.: 16/172,950

(22) Filed: Oct. 29, 2018

(65) Prior Publication Data

US 2019/0068755 A1 Feb. 28, 2019

Related U.S. Application Data

(63) Continuation of application No. 14/768,594, filed as application No. PCT/US2013/030858 on Mar. 13, 2013, now Pat. No. 10,218,815.

(51) Int. Cl.
*G06F 3/048* (2013.01)
*H04L 29/08* (2006.01)

(52) U.S. Cl.
CPC .............. *H04L 67/36* (2013.01); *G06F 3/048* (2013.01); *H04L 67/30* (2013.01)

(58) Field of Classification Search
CPC .......... H04L 67/30; H04L 67/36; G06F 3/048
See application file for complete search history.

(56) References Cited

U.S. PATENT DOCUMENTS

| 7,149,297 B2 | 12/2006 | Idoni et al. |
| 7,421,458 B1 | 9/2008 | Taylor et al. |

(Continued)

FOREIGN PATENT DOCUMENTS

| CN | 101690105 A | 3/2010 |
| CN | 101783838 A | 7/2010 |
| CN | 102834830 A | 12/2012 |

OTHER PUBLICATIONS

International Search Report for PCT/US2013/030858 dated Apr. 2, 2014.

(Continued)

*Primary Examiner* — Nicholas Klicos

(74) *Attorney, Agent, or Firm* — Buchanan Ingersoll & Rooney PC

(57) ABSTRACT

A method and apparatus include a terminal device receiving a first message from a server that hosts a service available to the terminal device. The first message includes information about at least one attribute relating to a changeability of that at least one attribute having been changed. The terminal device sends a second message to the server in response to the first message that includes information identifying the information about the at least one attribute of the first message. The terminal device receives a third message from the server that includes information indicating a changeability setting for each of the at least one attribute identified in the first message. The terminal device updates how a user interface for the service is to be displayed so the user interface is displayed with attributes relating to the service being indicated as changeable or unchangeable in accordance with the third message.

20 Claims, 5 Drawing Sheets

(56) References Cited

U.S. PATENT DOCUMENTS

| | | |
|---|---|---|
| 8,402,134 B1 | 3/2013 | Hir |
| 2002/0052952 A1 | 5/2002 | Yoshida et al. |
| 2002/0069081 A1 | 6/2002 | Ingram et al. |
| 2002/0186260 A1 | 12/2002 | Young |
| 2004/0025048 A1 | 2/2004 | Porcari et al. |
| 2004/0190034 A1 | 9/2004 | Ozawa et al. |
| 2004/0268125 A1 | 12/2004 | Clark et al. |
| 2005/0123117 A1 | 6/2005 | Stockdale |
| 2005/0223022 A1 | 10/2005 | Weissman et al. |
| 2006/0141985 A1 | 6/2006 | Patel et al. |
| 2006/0170947 A1 | 8/2006 | Kurabayashi |
| 2006/0242139 A1 | 10/2006 | Butterfield et al. |
| 2006/0294578 A1* | 12/2006 | Burke .................. G06F 21/604 726/2 |
| 2007/0005561 A1 | 1/2007 | Sakura et al. |
| 2007/0025344 A1 | 2/2007 | Rothman et al. |
| 2007/0239653 A1 | 10/2007 | Kiehn |
| 2008/0163253 A1 | 7/2008 | Massmann et al. |
| 2009/0092133 A1 | 4/2009 | Mok et al. |
| 2009/0181654 A1 | 7/2009 | Koch et al. |
| 2010/0239081 A1 | 9/2010 | Krantz et al. |
| 2011/0040793 A1 | 2/2011 | Davidson et al. |
| 2011/0088091 A1 | 4/2011 | Petronijevic et al. |
| 2011/0110511 A1 | 5/2011 | Vendrow et al. |
| 2011/0131572 A1 | 6/2011 | Elyashev et al. |
| 2011/0145689 A1 | 6/2011 | Campbell et al. |
| 2011/0235790 A1 | 9/2011 | Strope et al. |
| 2012/0278475 A1 | 11/2012 | Papakipos et al. |
| 2013/0097662 A1 | 4/2013 | Pearcy et al. |
| 2013/0268889 A1 | 10/2013 | Barak et al. |
| 2013/0347096 A1 | 12/2013 | Lee |
| 2014/0020085 A1 | 1/2014 | Srour et al. |
| 2014/0143543 A1 | 5/2014 | Aikas et al. |
| 2015/0058460 A1 | 2/2015 | Seago |
| 2015/0230087 A1 | 8/2015 | Barkan |

OTHER PUBLICATIONS

Written Opinion of the International Searching Authority for PCT/US2013/030858 dated Apr. 2, 2014.

\* cited by examiner

A terminal device receives a first message from a server that supports a service offered via an application run on the terminal device that includes identifies one or more attributes associated with the service hosted by the server has been updated.

The terminal device sends a second message to the server in response to the received first message that requests updated information corresponding to the updated information for the one or more attributes identified in the first message.

The terminal device receives a third message from the server that identifies a change in a changeability feature for the one or more attributes identified in the second message.

The terminal device updates its user interface display settings for displaying features associated with the service hosted by the server via the application being run by the terminal device in accordance with the information provided in the third message.

The terminal device displays the updated user interface

FIGURE 4

METHOD, DEVICE, AND SYSTEM FOR COMMUNICATING A CHANGEABILITY ATTRIBUTE

CROSS-REFERENCE TO RELATED APPLICATIONS

This is a continuation of U.S. patent application Ser. No. 14/768,594, filed on Aug. 18, 2015, which is the U.S. national stage application of International Patent Application No. PCT/US2013/030858, filed on Mar. 13, 2013.

FIELD OF INVENTION

The present invention relates to communication systems, such as communication systems that utilize cellular phones, mobile computer devices, tablets, laptops, or other terminal devices. More particularly, the present invention relates to a system, method and device configured to permit the communication of a changeability attribute to a communication terminal device so that a user interface displayed by that device may be updated or displayed in accordance with the changeability attributes assigned to that device or a user associated with that device.

BACKGROUND OF THE INVENTION

In many communication systems, a user of a terminal device is typically unable to determine whether he has authority to change certain features of a service that may be provided by a server without attempting to change a feature and subsequently receiving an error message from that server. For instance, in some systems, a Computer-Supported Telecommunications Application ("CSTA") compliant terminal device may send a message to a server concerning a call feature such as a call forwarding feature to change how that feature is processed. If the user of that device is not authorized to change this feature, the server may send an error message from the server in response to this attempt to change the feature. Such an error message can detract from a user's experience as he or she may be unable to easily ascertain why a given feature cannot be changed in accordance with the user's preference. Such an experience may also result in the user feeling that he or she unnecessarily spent her time attempting a feature change to something that was unable to be changed, which also detracts from the user's experience working with his or her device.

We have determined that a new device, system, and method are needed to permit a user to easily ascertain what features of an application that may rely upon a server to support the feature can be changed by the user of the device.

SUMMARY OF THE INVENTION

A method of communicating changeability attribute information, a system for practicing such a method, a terminal device and a server for practicing such a method and a computer readable medium that has an application stored thereon that defines practicing embodiments of such a method are provided. In one embodiment of the method, the method includes the step of a terminal device receiving a first message from a server that hosts a service available to the terminal device. The first message includes information about at least one attribute relating to a changeability of that at least one attributed having been changed. The method may also include the steps of the terminal device sending a second message to the server in response to the first message that includes information identifying the information about the at least one attribute of the first message and the terminal device receiving a third message from the server that includes information indicating a changeability setting for each of the at least one attribute identified in the first message. The terminal device may then update how a user interface for the service is to be displayed in response to the third message such that the user interface is displayable so that the at least one attribute relating to the service is identified as being changeable or unchangeable in accordance with the information indicating the changeability setting of the third message.

Embodiments of the method may be configured so that the updating of the user interface occurs such that the user interface is displayable so that only indicia corresponding to attributes that are changeable by the user is displayable. For instance, indicia corresponding to attributes the user is unauthorized to change may not be displayed on the user interface. Alternatively, the user interface may be updated such that the user interface is displayable so that indicia for the at least one attribute that is changeable by the user are displayed adjacent to adjustability indicia that indicate at least one changeability option for the at least one attribute. Indicia corresponding to attributes the user is unauthorized to change may be displayed via the user interface to indicate those attributes are not changeable by the user.

Embodiments of the method may be configured so that the first message is sent by the server upon a determination that the at least one attribute is comprised of a plurality of attributes that is more than a predetermined number of attributes and that the terminal device receives a fourth message from the server that hosts the service available to the terminal device when the at least one attribute that has been change is below the predetermined number of attributes. The fourth message includes information identifying the at least one attribute and information indicating the changeability setting for each of the at least one attribute. The terminal device may subsequently update its user interface based upon the received fourth message such that the user interface is displayable so that the at least one attribute relating to the service is identified as being changeable or unchangeable in accordance with the information indicating the changeability setting of the fourth message.

The first message may have any of a number of possible structures. In one embodiment, the first message may include a private data field that has information about at least one attribute relating to the changeability of that at least one attribute having been changed.

In some embodiments, the terminal device may send the second message upon an application associated with the service being activated on the terminal device. The terminal device may also send the second message in response to the terminal device being turned off and subsequently being turned on.

The application associated with the service may be hidden from the user when the terminal device receives the first message and the terminal device sends the second message in response to the application associated with the service being activated so that it is no longer hidden from the user. For instance, the application may be running in the background and not be an actively run application when the terminal device receives the first message and may only send the second message in response to the user providing input to activate the application so that a user interface for that application is actively displayed by the terminal device via a display device of the terminal device.

An embodiment of the communication system may include at least one terminal that includes a first terminal and a server that hosts a service. The server may be communicatively connectable to the first terminal device. The first terminal device may receive a first message from the server. The first message includes information about at least one first attribute relating to a changeability of that at least one first attributed having been changed. The first terminal device sends a second message to the server in response to the first message that includes information identifying the information about the at least one first attribute of the first message. The first terminal device then receives a third message from the server that includes information indicating a changeability setting for each of the at least one first attribute identified in the first message. The first terminal updates how a user interface for the service is to be displayed in response to the third message such that the user interface is displayable so that the at least one first attribute relating to the service is identified as being changeable or unchangeable in accordance with the information indicating the changeability setting of the third message.

In some embodiments of the system, the at least one terminal device is also comprised of a second terminal device. Other embodiments of the system may include additional terminal devices such as third and fourth terminal devices. It should be appreciated that each of the terminal devices may be one of: a tablet, a smart phone, a mobile cellular phone, an internet appliance, a laptop computer, a desktop computer apparatus coupled to a telephone device, a workstation, a mobile computer device, a Session Initiation Protocol ("SIP") communication endpoint, or other communication terminal.

In one embodiment of the system, the second terminal device may receive a fourth message from the server that includes information about at least one second attribute relating to a changeability of that at least one second attribute having been changed. The second terminal device may then send a fifth message to the server in response to the fourth message. The fifth message may include information identifying the information about the at least one second attribute of the fourth message. The second terminal may then receive a sixth message from the server that includes information indicating a changeability setting for each of the at least one second attribute identified in the fourth message. The second terminal may then update how a user interface of the second terminal for the service is to be displayed in response to the sixth message such that the user interface of the second terminal is displayable in response to the sixth message such that the user interface of the second terminal is displayable so that the at least one second attribute relating to the service is identified as being changeable or unchangeable in accordance with the information indicating the changeability setting of the sixth message.

The server may generate information identifying changeability attributes associated with the service that identifies the at least one first attribute relating to the service that the user of the first terminal device is authorized to change or adjust for including within the third message. For instance, such information may be generated by the server in response to a receipt of input from an administrator that changes a setting applicability to the at least one first attribute for the user of the first terminal device.

An embodiment of the terminal device may include non-transitory memory communicatively connected to a processor unit. The memory may have an application that defines a method performed by the terminal device when the application is run by the processor unit. The method may be any embodiment of the above noted methods or an embodiment of a method discussed further below. In other embodiments, the method defined by the application may be a method that includes the steps of the terminal device receiving a first message from the server that hosts a service available to the terminal device that includes information indicating a changeability setting for the at least one attribute identified in the first message and the terminal device updating how a user interface is to be displayed in response to the first message so that the user interface is displayable so that at least one attribute relating to the service is identified as being changeable or unchangeable in accordance with the information indicating the changeability setting of the first message.

A method of communicating changeability attribute information is also provided that includes the step of a terminal device sending a first message to a server that supports a service in response to being turned on. The first message comprises information identifying at least one attribute of the service. The terminal device receives a second message from the server that comprises information indicating a changeability setting for each of the at least one attribute identified in the first message. The terminal device updates how a user interface for the service is to be displayed in response to the second message such that the user interface is displayable so that the at least one attribute relating to the service is identified as being changeable or unchangeable in accordance with the information indicating the changeability setting of the second message.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred devices, systems, and apparatuses for providing communications between multiple communication devices are shown in the accompanying drawings and certain present preferred methods of practicing the same are also illustrated therein. It should be understood that like reference numbers used in the drawings may identify like components.

FIG. 4 is a flow chart of an exemplary communication method by which a changeability attribute may be communicated to a terminal device. It should be understood that embodiments of a communication system or a communication apparatus may utilize this exemplary method.

DETAILED DESCRIPTION OF PRESENT PREFERRED EMBODIMENTS

Figure 1:
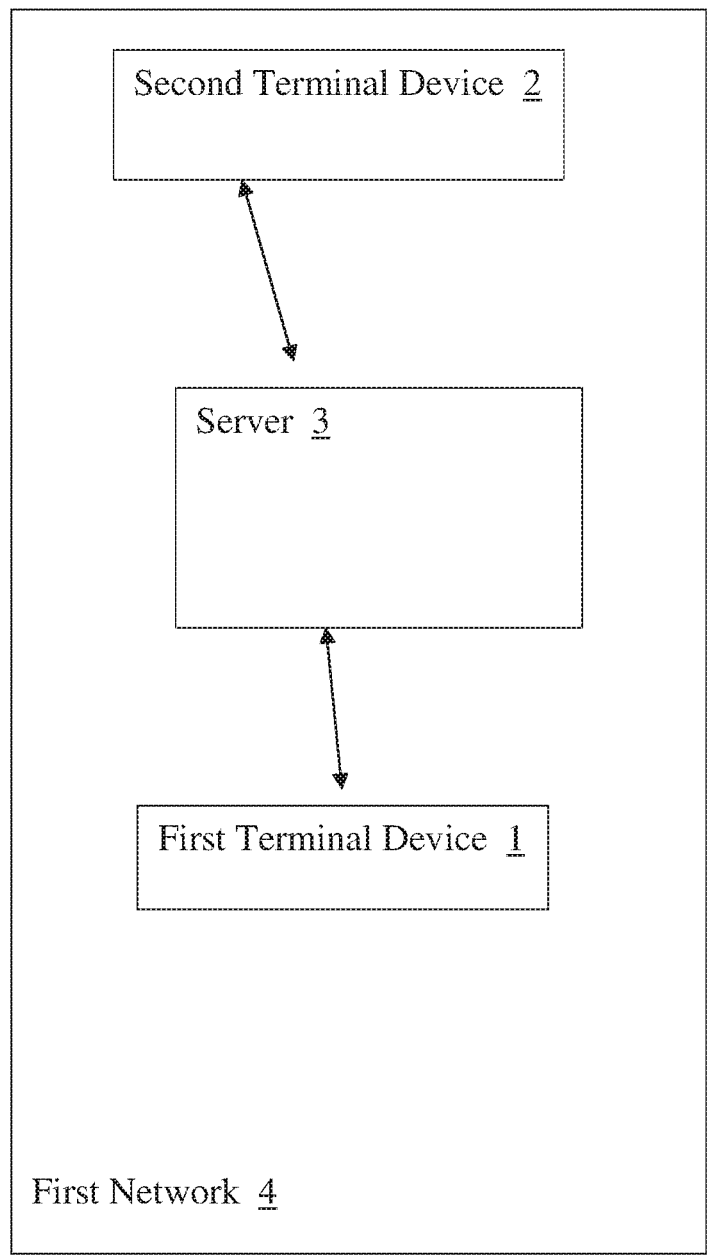
FIG. 1 is block diagram of an exemplary embodiment of a communication system.
Figure 2:
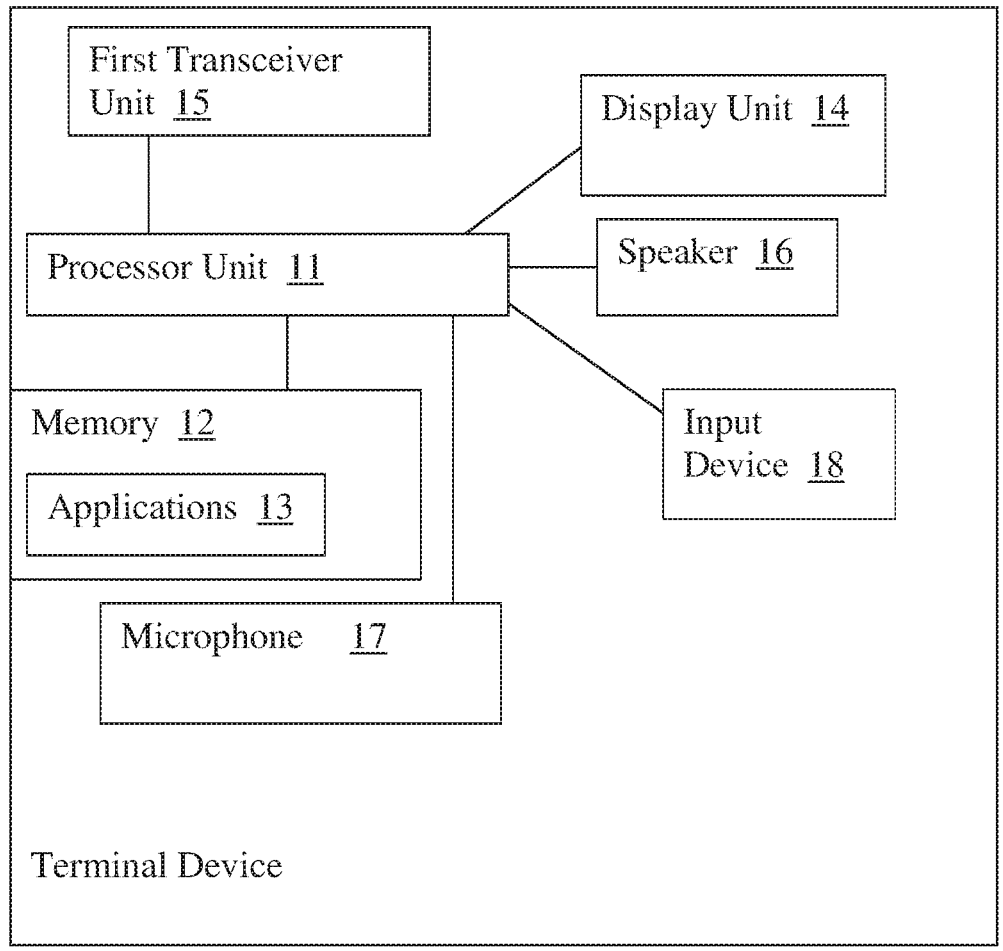
FIG. 2 is a block diagram of an exemplary embodiment of a terminal device that may be utilized in embodiments of the system.
Figure 3:
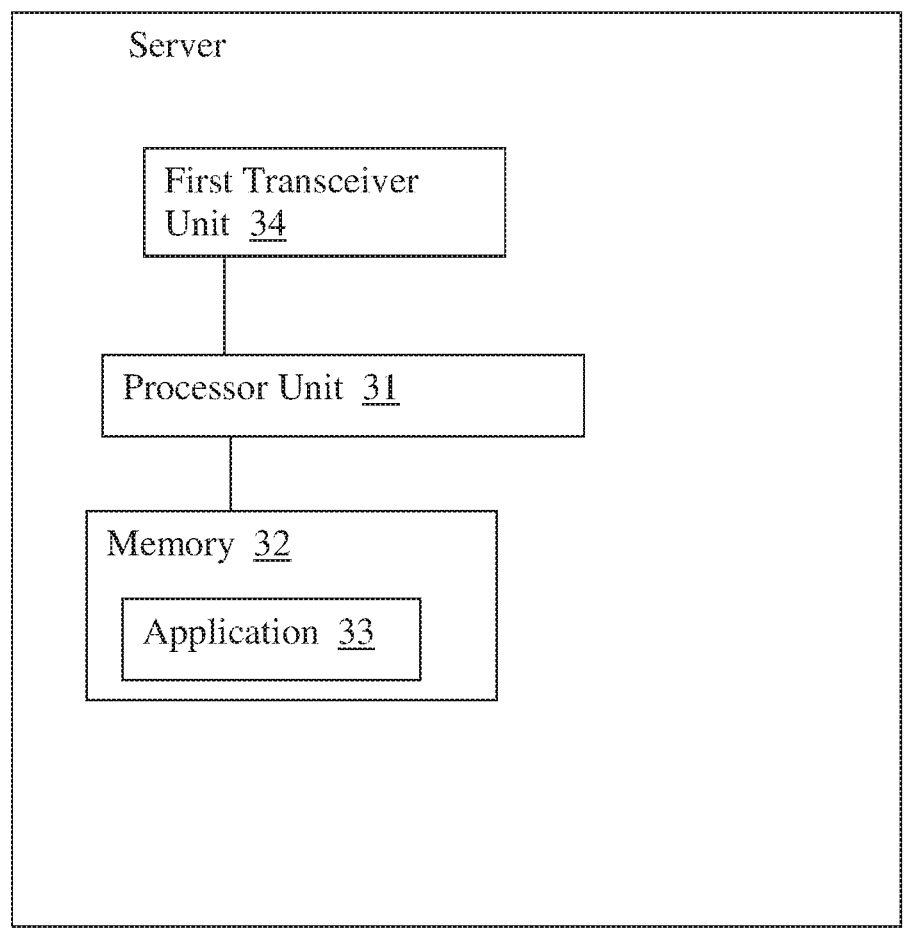
FIG. 3 is a block diagram of a server that may be utilized in embodiments of the communication system.

Referring to FIGS. 1-4, a communication system may include a communication a first terminal device 1, a second terminal device 2 and a server 3 within a first network 4. The first terminal device 1 may be communicatively connected to the server 3 and the second terminal device 2 may be communicatively connected to the server 3.

It should be understood that the first network may be a wireless local area network, a wireless wide area network, an enterprise network, or other type of network. For example, in some embodiments, the first and second terminal devices 1, 2 may be in separate local area networks and the first network 4 may be a wide area network in which the server is positioned. For instance, in one embodiment the first network 4 may be an enterprise network and the server may be in a first branch network of the enterprise network and the first and second terminal devices may be in a second branch network of the enterprise network. As another example, the first and second terminal devices 1, 2 may be within local area networks that are part of the wide area network of the first network 4. In other embodiments, the server 3 may be within the same local area network as the first and second terminal devices 1, 2 or may be in the same local area network as only one of the first and second terminal devices 1, 2.

It should be understood that the first network 4 may include multiple other network elements not shown. For instance, the first network 4 may include one or more gateways, additional terminal devices, network nodes, boarder control elements, other servers that host different types of services, or other network elements to help facilitate communications between different communication devices within the network.

The terminal devices may each be a SIP communication endpoint. For instance, the first terminal device 1 and the second terminal device 2 may each be one of: a tablet, a smart phone, a mobile cellular phone, an internet appliance, a laptop computer, a desktop computer apparatus coupled to a telephone device, a workstation, a mobile computer device, or other communication terminal. Each terminal device may include a processor unit 11 that is communicatively connected to a first transceiver unit 15 at least one input device 18, memory 12, at least one microphone 17, a display unit 14 and at least one speaker 16. The first transceiver unit 15 may include a receiver unit and a transmitter unit for transmission and reception of data via a cellular network, a wireless network connection, or other network connection.

The processor unit 11 may be a central processing unit such as a microprocessor, interconnected microprocessors, or other hardware processor element. The speaker 16 may emit audio and the microphone 17 may be an input device that records audio emitted by a user for receiving that audio data. In some embodiments, there may be multiple speakers and multiple microphones.

The display unit 14 may be a liquid crystal display or other display device. The display unit 14 may be configured as a touch screen display that functions to output data visually while also permitting a user to provide input by touching different portions of the display. The input device 18 may be a button, keyboard, mouse, or other type of input device a user may utilize to provide input.

The memory 12 may be a non-transitory computer readable medium that has one or more applications 13 stored thereon that defines a method that is performed by the terminal device when the processor unit 11 runs or executes the one or more application 13. One example of such a method defined by an application may be appreciated from FIG. 4. The memory 12 may include a hard drive, a flash drive, an optical disk or a hard disk or other type of computer readable medium that stores data for a non-transitory period of time.

The first terminal device 1 and the second terminal device 2 may each have an application that requires communication with an application server during the execution of the application. The application server may be a server 3 that helps facilitate one or more services available to a user of the terminal device when that device is running the application.

The first communication endpoint may be communicatively connected to the server 3 so that it can receive and send messages to the server 13. The server 3 may communicate with the first and second terminal devices 1, 2 to help facilitate the establishment of communication sessions such as phone calls, text messages, or other types of communication sessions or to provide other services or facilitate other services to one or both of these terminal devices.

The server 3 may include a first transceiver unit 34 that is communicatively connected to a processor unit 31. The processor unit 31 may also be connected to memory, such as non-transitory memory. The memory 32 may have at least one application 33 stored thereon. The application can include program code that defines instructions that define a method that the server performs when the processor unit 31 executes the application 33. It should be understood that the memory 32 may also include one or more databases or other data that contains information that may be accessed to route calls, redirect communications, or provide other services hosted by the server. The first transceiver unit 33 may be configured to permit communications to be established between the server and other devices such as other servers or communication terminal devices. For instance, the server may send data to different communication endpoints via the first transceiver unit 33 so that one or more features of a communication attempt such as call forwarding or other telephony feature supported by the server may be established, maintained or otherwise supported by the server. The server 3 may also provide data to different network elements to help facilitate one or more communication sessions such as application sessions for supporting an application being run on an endpoint such as the first terminal device 1 or second terminal device 2.

The server 3 may be configured to support a service that is available to a terminal device utilizing an application such as the first or second terminal device. An administrator that is responsible for overseeing the performance of that service may set one or more features so that a user of the terminal device is unable to change certain features of the service. For instance, a service may be configured so that a user who is not a manager or executive is unable to adjust a particular set of features of a call forwarding service. As another example, a call forwarding service supported by the server 3 may be configured so that only an approved information technology staff person may adjust certain call forwarding service features associated with the service hosted by the server 3. For instance, in one embodiment the service supported by the server 3 can be related to the handling of call forwarding or other telephony services and may adjust its user interface to adjust how indicia is displayed for call forwarding, voice mail related features and other telephony related features such as, for example, immediate call forwarding, call forwarding in event of a busy signal and call forwarding in the event the user associated with the device's presence is identified as being busy or unavailable. Other examples of the service or services that may be supported by the server 3 can include forward on do not disturb, forward on no reply, forward on no reply with a predefined delay duration, forwarding based on internal and external calls, automatic call distribution agent states, automated call distributor agent states such as logged on/off, ready/not ready, and working after cal. Other services that may be supported by the server 3 may include automatic work after, agent group features, auto answer on/off state, call privacy on/off state, and do not disturb settings for internal and external calls and for specific calls. Voice message attributes may also be supported by the server 3. It should be understood that the one or more attributes may be attributes or features of a service that is compliant with CSTA, Java Telephony Application Programming Interface ("JTAPI"), Telephony Application Programming Interface ("TAPI"), or other computer telephony integration ("CTI") standards.

The server 3 may send a first message to the first and second terminal devices 1, 2 that may be affected by the feature settings set by an approved administrator. The server may communicate such a first message by sending an appropriate service feature message (e.g. a Forwarding Event message for a Call Forwarding feature) that includes private data that indicates one or more attributes associated with the service hosted by the server that is not conveyed by a standardized event parameter has been updated. The first message may inform the terminal device that receives the message to send a request as a second message to the server 3 to obtain updated information about the changed attributes of the service.

Alternatively, the first message may directly include information identifying attributes associated with the service that have had their changeability settings changed and what those new changeability settings are. Such a message may be sent by the server 3 when the number of attributes that have a changed changeability setting is below a threshold number or the server may be configured to always send such a type of message. Such a message may also include status information for each feature of the attributes that are changed. Additionally, such a message may include an instruction for the terminal device to request a full status report in a subsequent message to be sent to the server so that the server may respond to that subsequent request by providing a message that includes a full status report on all the attributes associated with the server that identifies the changeability settings for all of the attributes as well as statuses for all of the attributes.

In the case where the first message includes an instruction for the terminal device to send a request to the server, the first terminal device 1 or second terminal device 2 that receives the first message may respond to that first message by sending a second message to the server 3. The second message may be a Get Forwarding Request message, for example. The second message may request (implicitly or explicitly) information associated with the one or more attributes identified in the first message be provided to it that corresponds with the updated attributes of the service identified in the first message.

The second message may be sent at any of a number of different times. For instance, the terminal device may send the second message relatively soon after receiving the first message. As another option, the terminal device may send the second message when the application is actively running on the terminal device. For instance, the terminal device may receive the first message when the application is not currently running or is currently hidden from the user (e.g. not in active use). The second message may then be sent in response to the application being activated so that it begins running on the terminal device or is no longer hidden from the user. As yet another option, the second message may be sent in response to the terminal device being restarted.

It should be appreciated that delaying the sending of the second message can have certain advantages. For instance, a delay in sending the second message can avoid the terminal device having to send multiple second messages in the event different changeability options are changed at different times while the application is not in use, which can preserve bandwidth usage and power consumption of the device.

In response to the second message, the server may generate information identifying changeability attributes associated with the service that identifies attributes relating to the service that the user of the first terminal device is authorized to change or adjust for including within a third message. The server may subsequently send the third message that identifies a change in a changeability feature for each of the one or more attributes identified in at least one of the first message and the second message. In some cases, the third message may also identify the changeability settings of all other attributes associated with the service hosted by the server. A status of each attribute or a status for each feature of the service may also be provided within the third message. The updated changeability settings identified in the third message may indicate that one or more features or one or more attributes of a feature are no longer changeable by the user associated with the terminal device or that the user associated with the terminal device is now authorized to change certain features or attributes of those features that user previously was not authorized to adjust.

Figure 5:
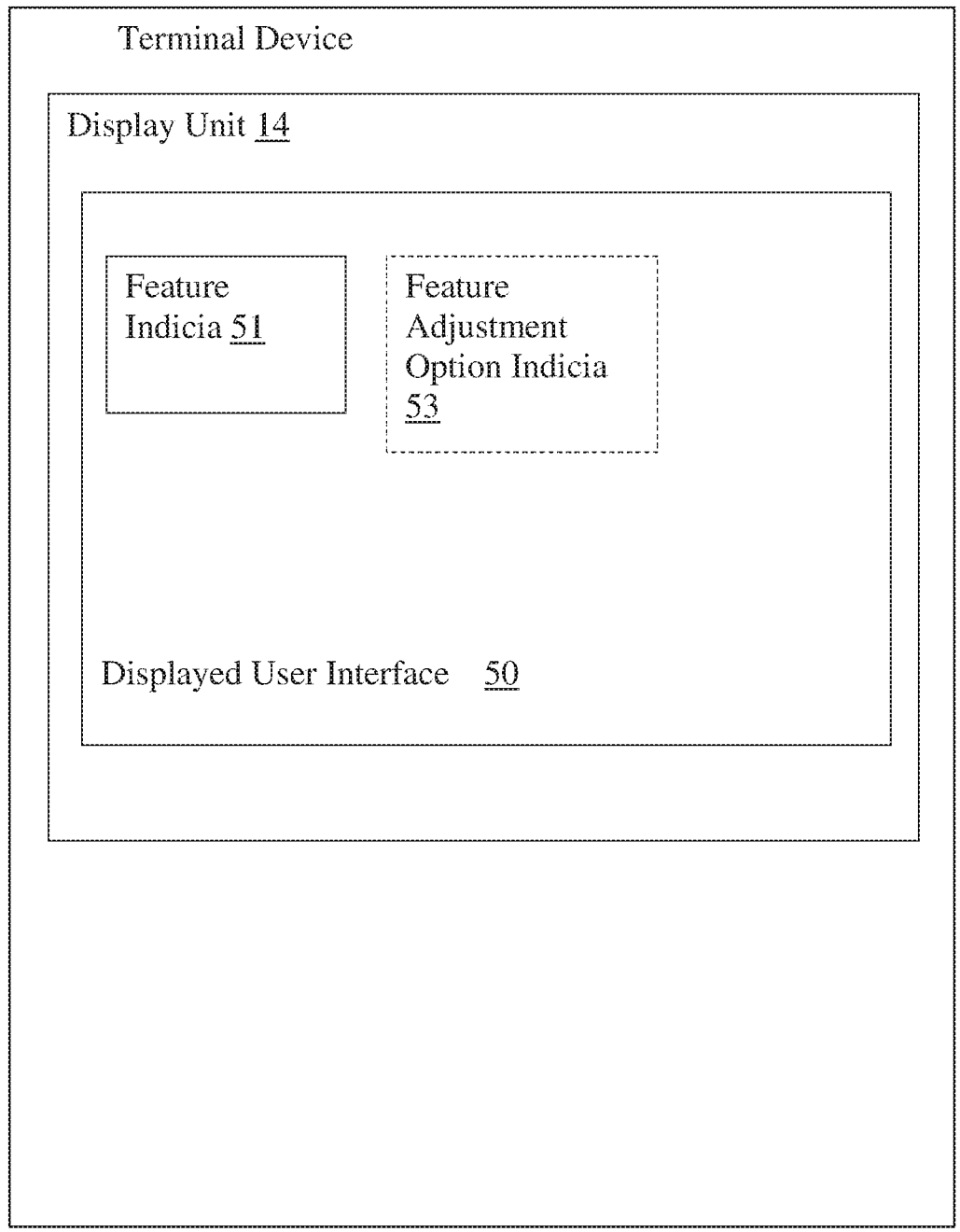
FIG. 5 is a block diagram illustrating an exemplary display of a user interface that may be utilized in embodiments of the communication system, terminal device, method, and communication apparatus.

In response to receiving the third message from the server, the terminal device may adjust settings that define how its user interface is displayed for the application via the display unit 14 so that when a user selects a view of features that can be adjusted for purposes of adjusting those features, only the features that the user is authorized to change are displayed via feature indicia 51 of the user interface 50 displayed by the display unit 14, as may be appreciated from FIG. 5. Features that are not changeable may not be displayed.

Alternatively, all the features may be displayed and indicia may be displayed on or adjacent the feature indicia 51 for each feature to indicate whether the feature is changeable or not by the user. For example, a user interface display may show four different features. Three features may be displayed in red text to indicate they cannot be changed and one feature may be displayed in blue text to indicate it can be changed. As another example, one or more changeability options may be displayed as different icons or other feature adjustment option indicia 53, which is shown in broken line in FIG. 5, positioned near an icon or other indicia representing a current setting of a feature for features that the user is authorized to change. Features the user is not authorized to change may not have other icons or other indicia representing different changes to the feature near it to indicate it is a feature that the user cannot adjust or change. The icons or other indicia representing options to which a certain feature may be changed may be touched by a user via a touch screen display unit or otherwise actuated (e.g. mouse click, pointer or stylus touching, etc.) to provide user input for adjusting that particular setting.

One example of an application that may have features that are changeable and not changeable is a telecommunications application that permits a terminal device to provide telephony functions. For instance, an application that helps facilitate voice over internet telecommunications services that is on a desktop computer, desktop telephone, mobile phone, cellular phone, internet appliance, tablet computer, laptop computer, or other terminal device may have such an application. A user interface for displaying settings of the application may be adjusted as discussed above in view of changeability data obtained via the third message received from a server that may support the services or host the services available to the terminal device when running the application. A user may be able to easily identify which features of the service available via the application is changeable based upon the displayed user interface as that interface may identify which of the features the user of the device is authorized to change. A user may therefore not attempt to change features that he or she is not authorized to change and quickly or easily identify what features are adjustable by the user.

Embodiments of the terminal device, method, and communication apparatus may also be configured so that old terminal devices that may be unable to understand data provided within the first message received from a server regarding changes to changeability options can ignore that data so that such information does not cause an error in such a terminal device's operation. In these cases, such legacy devices may be configured so that a display of all possible features as being changeable on its user interface are provided even though some of those features may not be changeable by the user logged in to that device or associated with that device. An error message may then be sent to the legacy device in the event a user attempts to adjust or change a feature he or she is unauthorized to change.

In some embodiments, a terminal device may be configured to send a message similar to the second message to the server upon the starting up or restarting of the terminal device or the application to be run by that device. In such an embodiment, the device may be able to update how its user interface displays features that a user associated with that device, such as a user that is logged into the device to use that device, is permitted to change in accordance with settings defined by the server 3 that hosts those services or otherwise helps facilitate those services upon receipt of the third message from the server 3 that responds to the message sent upon starting up or restarting.

It should be appreciated that variations to the above noted embodiments of the system, method, and apparatus may be made as those of at least ordinary skill in the art may appreciate. For instance, different systems may be configured to include multiple servers supporting different services and many more than two terminal devices. As yet another example, the server may be a computer device such as a work station or other type of server that hosts or supports at least one service. It should be understood that the design of an embodiment of a communication system, terminal device, or other type of communication apparatus may be configured to meet a particular set of design criteria As yet another example, it should be appreciated that the first message sent by the server 3 may include all the information included in the third message (e.g. the message may include information identifying changeability attributes associated with features of the service that identifies attributes relating to the service that the user of the terminal device is authorized to change or adjust) so that the terminal device need not send any response message requesting such information. Such an alternative may be utilized as a separate alternative to the use of first, second and third messages as noted above. As another option, such an alternative first message may be sent when the number of attributes affected by a change is below a predetermined number such as below three affected attributes or five affected attributes. Such a limitation on sending of direct first messages can prevent large messages from being periodically sent by a server every time changes are made so that bandwidth is better utilized in a particular system. Such a system would therefore be configured to utilize both a direct first message sent by a server as well as first messages that request the terminal device to send a responsive second message that requests a third message form the server that identifies the attributes that the user of the terminal device is authorized to change or not change. The selection of which type of first message is sent to the terminal device may be made by the server 3 based upon the total number of attributes affected by a particular change and the predetermined limit set by an administrator or otherwise defined for the server 3, or to ensure that the terminal device is fully synchronized with the server.

While certain exemplary embodiments of the communication device, communication system, computer readable medium, and methods of making and using the same have been shown and described above, it is to be distinctly understood that the invention is not limited thereto but may be otherwise variously embodied and practiced within the scope of the following claims.

What is claimed is:

1. A method of communicating changeability attribute information comprising:
a terminal device sending a second message to a server in response to a first message that comprises information about a changeability of at least one attribute for one or more features of a service hosted by the server having been changed received from the server that hosts the service, the second message comprising information identifying the information about the at least one attribute of the first message, the terminal device being an electronic device comprising a processor connected to a non-transitory computer readable medium configured to generate a user interface for use of the service including identifiers for features comprising a first feature having a first attribute of the at least one attribute; and
the terminal device updating how the user interface for the service is to be displayed in a display device connected to the terminal device in response to a third message received from the server that comprises information indicating a changeability setting for the first attribute such that the user interface is displayable so that one of:
(i) the identifier of the first attribute is changed from indicating the first attribute is an unchangeable attribute to indicating that the first attribute is a changeable attribute that is adjustable by a user via input that is entered via the user interface in accordance with the information indicating the changeability setting of the third message, and
(ii) the identifier of the first attribute is changed from indicating the first attribute is a changeable attribute that is adjustable by a user via input that is entered via the user interface to indicating that the first attribute is an unchangeable attribute that the user cannot adjust in accordance with the information indicating the changeability setting of the third message.

2. The method of claim 1 wherein the updating of the user interface occurs such that the user interface is displayable so that only indicia for features having attributes that are changeable by the user are displayable.

3. The method of claim 1 wherein the updating of the user interface occurs such that the user interface is displayable so that indicia for attributes of the first feature that are changeable by the user are displayed adjacent to adjustability indicia that indicate at least one changeability option for the attributes.

4. The method of claim 3 wherein indicia corresponding to attributes the user is unauthorized to change are displayed to indicate those attributes are not changeable by the user.

5. The method of claim 3 wherein indicia corresponding to the attributes the user is unauthorized to change are not displayed on the user interface.

6. The method of claim 1 comprising:
the server sending the first message.

7. The method of claim 6, wherein the first message sent by the server is sent upon a determination that the attributes that are changed is more than a predetermined number of attributes.

8. The method of claim 6 wherein the first message is comprised of a field of private data, the field of private data having the information about changeability of attributes that have been changed.

9. The method of claim 1 wherein the terminal device delays sending of the second message so that the terminal device sends the second message upon an application associated with the service being activated on the terminal device.

10. The method of claim 1 wherein the terminal device delays sending of the second message so that the terminal device sends the second message in response to the terminal device being turned on after having been turned off.

11. The method of claim 1 wherein an application associated with the service is hidden from the user when the terminal device receives the first message and the terminal device sends the second message in response to the application associated with the service being activated so that the application is no longer hidden from the user.

12. The method of claim 1 wherein the first feature relates to call forwarding.

13. The method of claim 1 wherein the first feature is for a telephony service.

14. A communication system comprising:
at least one terminal device comprising a first terminal device, the first terminal device comprising a processor connected to non-transitory memory;
a server that hosts a service, the server comprising a processor connected to a non-transitory computer readable medium, the server communicatively connectable to the first terminal device;
the first terminal device configured to receive a first message from the server, the first message comprising information about a first attribute for a first feature of the service relating to a changeability of the first attribute having been changed;
the first terminal device configured to send a second message to the server in response to the first message, the second message comprising information identifying the information about the first attribute;
the first terminal device configured to receive a third message from the server, the third message comprising information indicating a changeability setting for the first attribute;
the first terminal device configured to update how a user interface for the service is to be displayed in a display device connected to the first terminal device in response to the third message such that the user interface is displayable via the display device so that one of:
(i) an identifier for the first attribute is changed from indicating the first attribute is an unchangeable attribute to indicating that the first attribute is a changeable attribute by the user via input that is entered via the user interface in accordance with the information indicating the changeability setting of the third message, and
(ii) an identifier for the first attribute is changed from indicating the first attribute is a changeable attribute that is changeable by the user via input that is entered via the user interface to indicating that the first attribute is an unchangeable attribute that the user is not permitted to adjust in accordance with the information indicating the changeability setting of the third message.

15. The communication system of claim 14 wherein the at least one terminal device is comprised of a second terminal device, the second terminal device being an electronic device comprising a processor connected to non-transitory memory, and wherein:
the second terminal device configured to receive a fourth message from the server, the fourth message comprising information about a second attribute for a second feature of the service relating to a changeability of that second attribute having been changed;
the second terminal device configured to send a fifth message to the server in response to the fourth message, the fifth message comprising information identifying the information about the second attribute of the fourth message;
the second terminal device configured to receive a sixth message from the server, the sixth message comprising information indicating a changeability setting for the second attribute identified in the fourth message;
the second terminal device configured to update how a user interface of the second terminal device for the service is to be displayed in response to the sixth message such that the user interface of the second terminal device is displayable so that the second attribute is identified as being changeable or unchangeable in accordance with the information indicating the changeability setting of the sixth message.

16. The communication system of claim 15, wherein the second terminal device is configured to update how the user interface of the second terminal device for the service is to be displayed in response to the sixth message such that one of:
(i) an identifier for the second attribute is changed from indicating the second attribute is an unchangeable attribute to indicating that the second attribute is a changeable attribute by the user via input that is entered via the user interface in accordance with the information indicating the changeability setting of the sixth message, and
(ii) an identifier for the second attribute is changed from indicating the second attribute is a changeable feature that is adjustable by the user via input that is entered via the user interface to indicating that the second attribute is an unchangeable attribute that the user is not permitted to adjust in accordance with the information indicating the changeability setting of the sixth message.

17. The communication system of claim 15 wherein the server is configured to generate information identifying changeability attributes associated with the service that the user of the first terminal device is authorized to change or adjust for the first feature for including within the third message.

18. The communication system of claim 14, wherein the first feature relates to call forwarding.

19. The communication system of claim 14, wherein the first feature is for a telephony service.

20. A terminal device, the terminal device comprising non-transitory memory communicatively connected to a processor unit, the memory having an application that defines a method performed by the terminal device when the application is run by the processor unit, the method comprising:
- the terminal device sending a second message to a server that hosts a service in response to receiving a first message from the server, the second message comprising information identifying information about a first attribute for a first feature identified as having been changed in the first message;
- the terminal device updating how a user interface for a service is to be displayed in response to a third message indicating a changeability setting for the first attribute of the first feature of the service identified in the third message received from the server such that the user interface is displayable so that one of:
  (i) an identifier for the first attribute is changed from indicating the first attribute is an unchangeable attribute to indicating that the first attribute is a changeable attribute by the user via input that is entered via the user interface in accordance with the information indicating the changeability setting of the third message, and
  (ii) an identifier for the first attribute is changed from indicating the first attribute is a changeable attribute that is adjustable by the user via input that is entered via the user interface to indicating that the first attribute is an unchangeable attribute that the user is not permitted to adjust in accordance with the information indicating the changeability setting of the third message.

* * * * *